United States Patent [19]

Martin

[11] 4,316,694

[45] Feb. 23, 1982

[54] WIDE-MOUTH ARTICLE UNLOADING

[76] Inventor: Melvin S. Martin, Martindale, Pa. 17549

[21] Appl. No.: 40,243

[22] Filed: May 18, 1979

[51] Int. Cl.³ ............................................. B65G 59/10
[52] U.S. Cl. ................................ 414/120; 294/87 R; 294/158; 414/117
[58] Field of Search ............... 414/117, 120, 121, 786; 294/64 R, 86 R, 87 R, 93, 158; 248/317

[56] References Cited

U.S. PATENT DOCUMENTS

| | | | |
|---|---|---|---|
| 1,184,372 | 5/1916 | Nalley | 73/572 |
| 2,747,914 | 5/1956 | Lyons | 294/87 R |
| 3,078,020 | 2/1963 | Boonstra | 294/87 R X |
| 3,314,714 | 4/1967 | Brubaker | 294/93 |
| 3,418,020 | 12/1968 | Brubaker | 294/93 |
| 3,780,885 | 12/1973 | Van Der Roer | 414/120 X |
| 3,981,471 | 9/1976 | Currier | 294/93 X |
| 4,005,783 | 2/1977 | Pasch | 294/93 X |
| 4,091,945 | 5/1978 | Patterson | 414/121 X |

Primary Examiner—Galen L. Barefoot
Assistant Examiner—Terrance L. Siemens
Attorney, Agent, or Firm—Alexis Barron

[57] ABSTRACT

An unloader for removing hollow articles packed for shipment in nested layers is disclosed. The unloader includes retainer elements configured to engage interior surfaces of the hollow articles. Retentive forces arising from engagement of surfaces of the retainer elements with interior surfaces of the hollow articles as the retainer elements are inserted into the hollow articles are utilized to hold the articles on the retainer elements. Such forces can result from the deformation of elastic retaining elements as they are inserted into the article. A member or members associated with the unloader disengage the hollow articles from the unloader in a manner such that the hollow articles can be set down in an organized fashion. The embodiment disclosed is hand-manipulable.

19 Claims, 8 Drawing Figures

WIDE-MOUTH ARTICLE UNLOADING

FIELD OF THE INVENTION

This invention relates to material handling systems and specifically to devices and methods for unloading hollow articles, such as containers, that are shipped in stacks formed of a plurality of nested articles.

BACKGROUND OF THE INVENTION

The background and description of the invention that follows will be cast primarily in terms of greenhouse operations and conditions because it is there that it is believed to have its primary use. However, it should be realized that the invention may find use in other environments.

In commercial greenhouse operations, it is quite common to start the germination of and grow plants in lightweight, tapered, hollow plastic containers. If the plant is likely to be large at the time it is sold, then a relatively large individual pot is utilized. On the other hand, if the plant is started from seed and likely to be small at the time it is sold, then the germination takes place in a small, tapered cavity formed in a thin-walled, vacuum-formed tray that comprises on the order of 72 such cavities that are usually subdivided, as by partial die cutting along flanges between groups of the cavities, into groups. Such trays are hereafter referred to as "cells."

In a typical greenhouse operation, a plurality of pots or cells are placed on trays that are used to transport the plants throughout their stay in the greenhouse. It is on these trays that the pots are packed with soil, the seeds or plants placed in the pots and the trays then transported to benches for subsequent growing and handling. Heretofore, when arranging the pots or cells on the greenhouse trays, it has been necessary for the individual to remove the pots from the shipping container in which they are received from the supplier and, one at a time, or several at a time, arrange the pots or cells on the greenhouse trays. This is a lengthy operation involving substantial time and attendant high cost.

The pots or cells, as previously indicated, are usually received from a supplier in a shipping container that includes a plurality of layers of nested pots or cells. The pots or cells usually incorporate packing lugs so that they can be more easily removed from the stack.

Applicant has found that by the use of an unloader member having deformable retaining members that are urged into the pots, or some of the individual cavities of a cell, an entire layer of pots or an entire group of cells can be lifted out of the shipping container in a single operation and placed upon a greenhouse tray. It is especially advantageous if the number of pots in a single layer in the shipping carton corresponds to substantially the number of pots that are to be placed on a tray. If this is the case, then an entire tray can be loaded in a single operation.

SUMMARY OF THE INVENTION

It is an object of the invention to provide an unloader that can unload an array of nested hollow articles from a shipping container.

It is another object of the invention to provide an unloader of the type described that further provides means for disengaging the hollow articles from the unloader and depositing them on a receiving tray in a relatively ordered fashion.

It is a further object of the invention to provide the foregoing described functions in a device that can be operated by one hand of the user.

It is a still further object of the invention to provide an unloader of the type described that is of rugged construction and that is inexpensive to make.

Briefly, these objects are achieved by the use of a carrier element that comprises two parts that are movable toward and away from each other. Retaining elements depend from a bottom surface of the carrier element for engaging the hollow articles. The retainer elements include means responding to engagement of portions of the retainer elements and interior walls as the retainer element is inserted into the article for developing a holding force. An ejector system, operative upon relative movement between the parts, urges the pots out of engagement with the retaining elements.

DESCRIPTION OF THE PREFERRED EMBODIMENT

Figure 1:
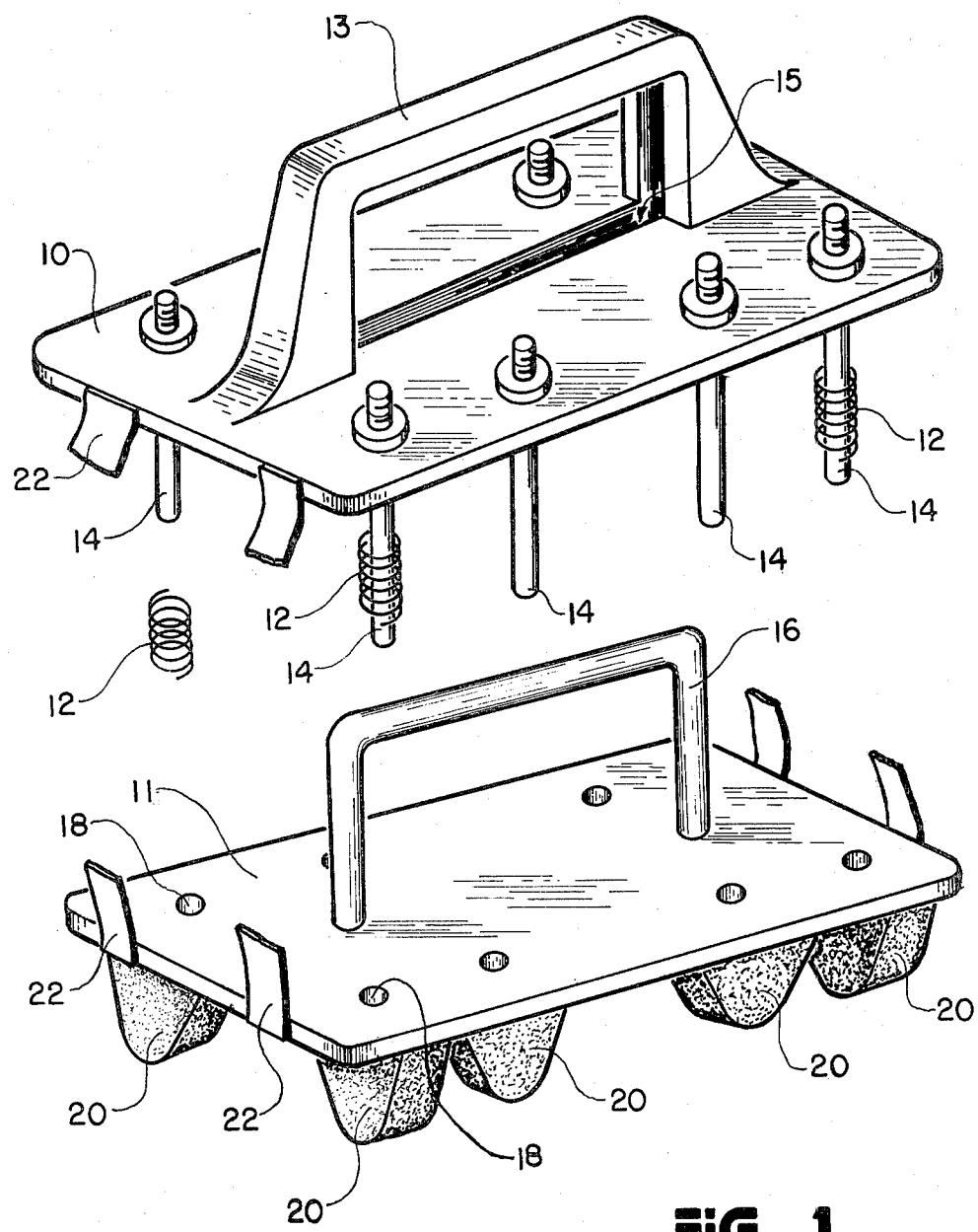
FIG. 1 is an exploded perspective view of an unloader in accordance with this invention, especially useful for cells.

As illustrated in FIG. 1, the preferred form of unloader comprises a carrier element that includes two plates, an upper plate 10 and a lower plate 11, that are arranged substantially parallel to each other. A handle 13 is mounted on the top surface of the upper plate 10 and is configured and sized so as to be grasped by one hand of the user. A plurality of pins 14 extend from the bottom surface of the upper plate 10. The pins 14 are, in the preferred embodiment, substantially parallel to each other and perpendicular to the plate 10 and are substantially rigid so as to preclude bending under normal use. The number of pins 14 disposed on the upper plate 10 can vary according to the intended use of the unloader, as will hereafter be described.

Figure 4:
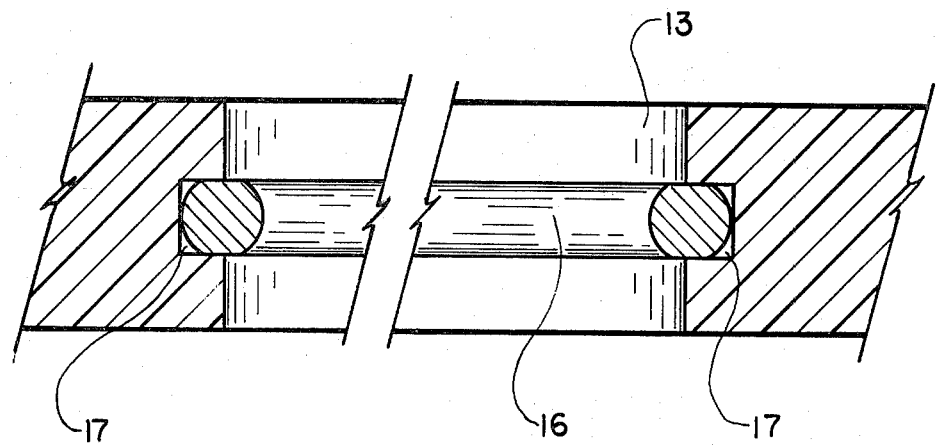
FIG. 4 is a fragmentary cross-sectional view of a portion of the handle of the unloader shown in FIG. 1.

The lower plate 11 includes a handle 16 mounted on the upper surface of the plate that is designed to extend upwardly through an aperture 15 in the upper plate 10 when the plates are assembled together. Referring to FIG. 4, when the plates 10 and 11 are assembled, the handle 16 extends within the handle 13 and slides in grooves 17 that are formed in the upstanding portions of the handle 13. The grooves 17 are sized so that they perform a guiding function for the handle 16. In this manner, a bearing function is supplied by the grooves 17 and handle 16 as the plates 10 and 11 are moved relative to each other.

The plate 11 also includes a plurality of apertures 18 extending through the plate. These apertures are equal in number to the number of pins 14 and are located so that the pins 14 can slide through the apertures 18 and extend below the plate 11.

Disposed on the bottom surface of the plate 11 are a plurality of retaining elements 20. The retaining elements 20 are configured so that they can be disposed within the interiors of the pots or some of the individual cavities of the cells and engage the interior side walls or bottoms of the pots or cavities. It should be realized that the side walls of the pots or cells are usually tapered outwardly along most of their length to facilitate removal of the plant for later transplanting. Further, the pots are open-topped, the cross-sectional areas of the pots usually being greatest at the region adjacent the top. The pots have no re-entrant portions adjacent the top, as such would interfere with removal of the plant from the pot. The retaining elements 20 must hold the pots by engagement with the sides or bottom walls of the pots, with sufficient retentive force to overcome the gravitational force so that the pots remain on the unloader as it is being carried by the user, yet in a manner that allows the pots to be readily and easily released.

The preferred manner of accomplishing these objectives is by the use of flexible, elastically compressible retaining members that deform at least slightly when urged into the interiors of the pots or cavities. The pot-engaging surfaces of the retaining members preferably have sufficiently high frictional characteristics that the pots are retained on the retaining elements by reason of the outwardly directed elastic forces resulting from deformation of the member and the coefficient of friction between the walls of the pots and the surface of the retaining member.

Figure 2:
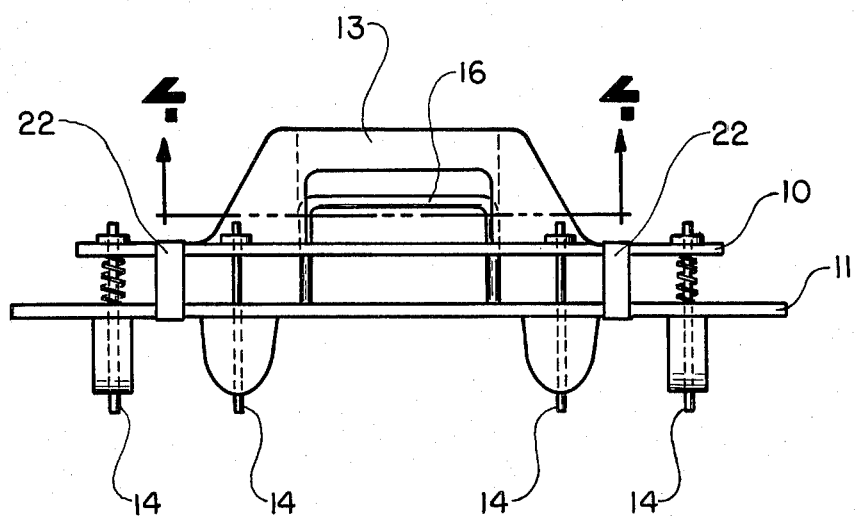
FIG. 2 is a side view of the unloader shown in FIG. 1 with parts thereof being in assembled form.
Figure 3:
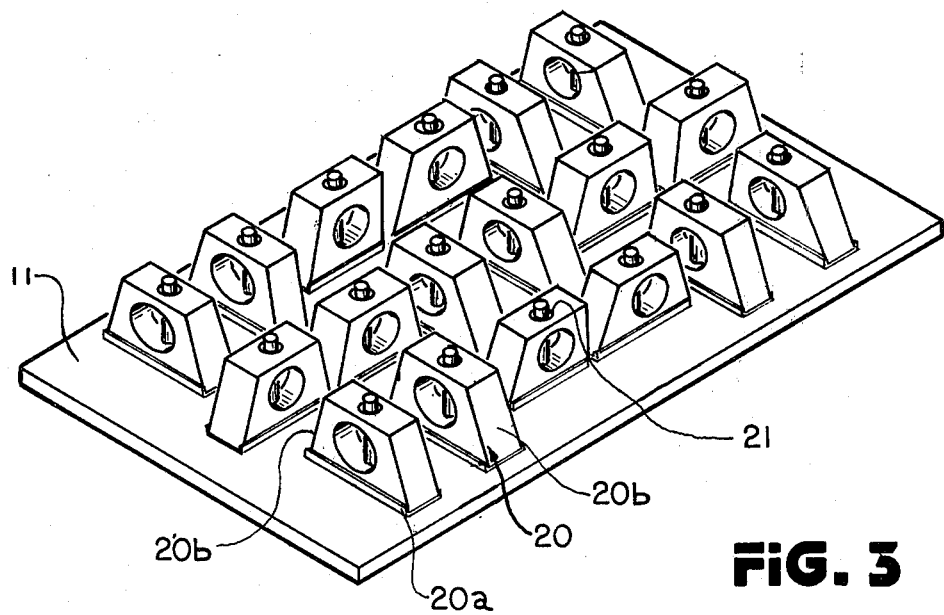
FIG. 3 is a perspective view of the bottom of another unloader especially useful for individual pots.

The particular shape of the retaining elements 20 will be determined primarily by the size and shape of the pots being used. For round flower pots, the retaining element 20 can be, for example, spherical. For cells or square pots, retaining elements having a rectangular cross section, but being somewhat rounded at their ends or trapezoidal in shape (as shown in FIG. 2 or FIG. 3, respectively), have been found useful.

Similarly, it is believed that many materials can be used to form the retaining elements 20. Almost any material that is readily elastically deformable and that has nonslip surface frictional characteristics can be used. It has been found that elastomeric foam materials that provide good frictional contact with the relatively smooth walls of the pots or cells function well. Such foams of sufficiently high compressibility will deform substantially without splitting or otherwise damaging the relatively thin-walled pots.

It is contemplated that, to increase the longevity of the unloader and also increase the number of different shapes of pots that it can be used with, the retaining elements 20 should be readily removable and replaceable. This could be accomplished by securing the retaining elements in holders 20a that can be removably mounted on the bottom of lower plate 11 by appropriate means, for example, screws that extend through the plate 11 and engage suitable fasteners on the holders.

The number and arrangement of the retaining means is determined in part by the intended use of the unloader. If it is to be used for cells that are usually lightweight and at least partially secured together, then only a few spaced retainer elements, as shown in FIGS. 1 and 2, are necessary. If the unloader is to be used for individual pots, then there must be an array of more closely spaced retainer elements, as illustrated in FIG. 3. Desirably, there should be one retainer element for each pot to be lifted. Maximum benefit is achieved if the spacing arrangement and number of stacks of pots in a shipping container (and thus of the retainer elements) is the same as the desired arrangement of pots on the greenhouse tray.

In addition, it has been found desirable to orient the retaining elements 20 in a manner that facilitates alignment of the unloader with the array of pots. To accomplish this, the retaining elements are oriented so that the article-engaging surfaces 20b (FIG. 3) of at least some of the retainer elements are positioned transversely with respect to others. As illustrated in the FIG. 3 form, in the two endmost rows, the two outboard retaining elements are transverse to the longitudinal axis of the plate and the center retainer element is substantially parallel to that axis. In the middle two rows, two outboard retainer elements are parallel to the longitudinal axis of the plate and the center ones are substantially transverse to that axis. This offsetting arrangement helps to align the unloader longitudinally and laterally with respect to the array of pots or cells in a shipping container and aids in preventing a mismatch whereby a row of the pots may not be engaged by the unloader.

It is believed that other forms of retaining elements could also be utilized that provide the desired adherence characteristics. Thus, retaining elements incorporating a vacuum holding feature, for example, by suction cups, could be used. It would also be possible to promote adherence by the use of materials having a more or less permanent, yet relatively light, tack.

Referring again to FIG. 3, in the preferred embodiment, retaining elements 20 are located on the plate 11 in positions surrounding each of the pins 14. The pins 14 extend through bores or openings 21 in the retaining elements 20. However, it should be realized that it is not necessary for the pins 14 to be located in this fashion. If the unloader is to be used with, for example, cells, the pins 14 can be located in other positions to bear against flange portions of the cells. In the latter situation, the number of pins 14 can also be reduced because it is not necessary to have the number of pins correspond to the number of cavities in the cell.

As shown in FIG. 2, it has been found advantageous to have pins 14 of a length such that their ends extend beyond the bottom surfaces of the retaining elements 20 when the plates are at the maximum distance apart, as when the unloader is not being used. The advantage of this arrangement is that the unloader can be placed on the flat surface, with the handle 13 facing upwardly, and the full weight of the unloader will be supported on the pins 14. This avoids damage to or permanent deformation of the retaining elements 20.

Also, it is advantageous to mount the pins so that the distance they extend from the plate 10 is adjustable. This allows the unloader to accomodate pots or cavities of different depths. Thus, the pins could be provided with threads at the ends received in plate 10 and could be provided with suitable locking means for holding the pins at the desired length.

Referring to FIGS. 1 and 2, the plates 10 and 11 are biased away from each other and this can most conveniently be accomplished by the use of several compression coil springs 12 that are disposed about portions of some of the pins 14 that extend between the plates. The distance that the plates can move apart is limited by stop means that can comprise, for example, flexible straps 22, the respective ends of which are affixed to the plates. It is also contemplated that stop means performing the same function could be provided by stops mounted on the pins 14 that prevent further movement of the plate 11. The spacing of the plates and the position of handle 16 when the plates are spaced the greatest distance apart, as established by the stop means, are inter-related so that the handle 16 can be grasped by the fingers of the hand holding handle 13.

Figure 5:
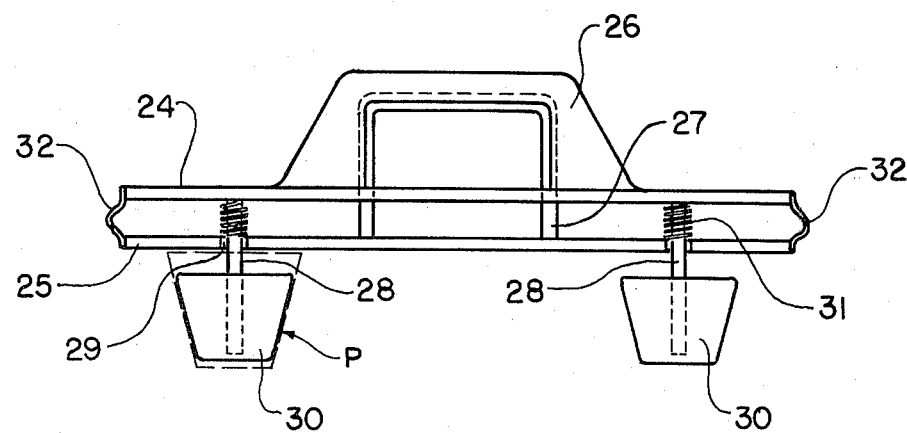
FIG. 5 is a side view of another form of unloader incorporating the invention.

Another form of unloader device is illustrated in FIG. 5. In this form, the carrier element also comprises two substantially parallel plates, an upper plate 24 and a lower plate 25. The top side of the upper plate 24 includes a handle 26 that receives a second handle element 27 extending upwardly from the lower plate 25 in the fashion previously described with respect to handles 13 and 16. In this arrangement, a plurality of studs 28 extend from the upper plate 24 through apertures 29 in the lower plate 25. Elastically deformable retaining elements 30 that are suitably shaped and sized, as previously discussed, are mounted on the ends of the studs 28. As in the FIG. 1 form, the plates 24 and 25 are biased apart by suitable means, for example, compression springs 31. Stop means, for example, strap elements 32, limit movement of the plates 24 and 25 away from each other. As will hereafter be described, this form operates in substantially the obverse fashion to the form illustrated in FIGS. 1–3.

Figure 6A:
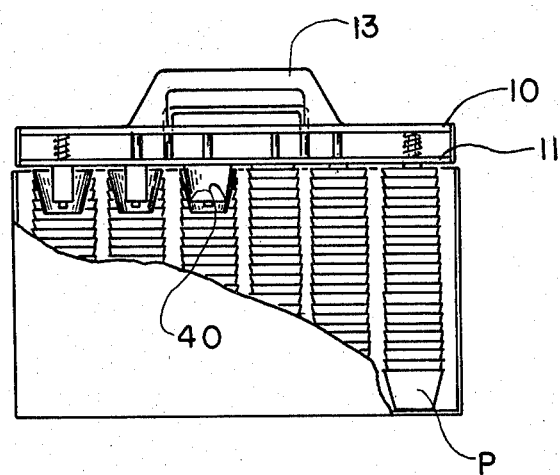
FIGS. 6a, 6b and 6c illustrate the operation of the unloader shown in FIGS. 1-3.
Figure 6B:
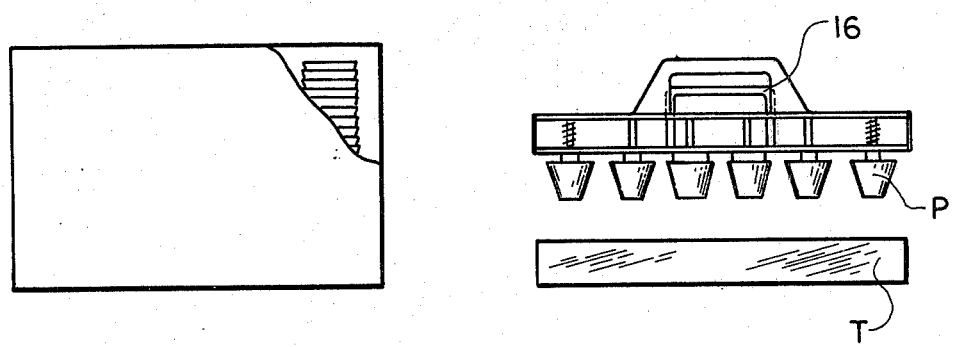
Figure 6C:
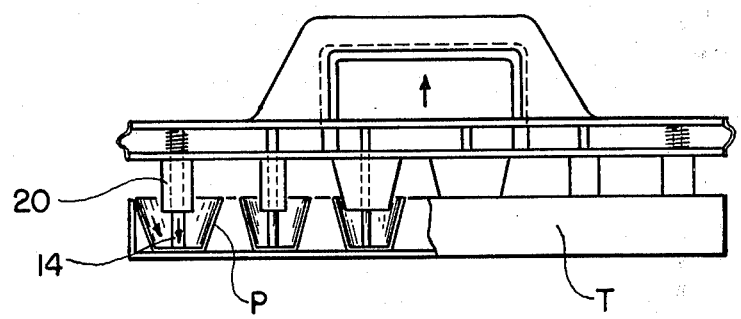

FIGS. 6a, 6b and 6c illustrate a typical operating sequence for an unloader in accordance with the invention. As shown in FIG. 6a, a supply of individual plastic pots P arrive from a supplier in a container, usually a cardboard carton, that is packed with a plurality of stacks of nested pots. When packed in this fashion, the nested pots form distinct layers at the elevation of each pot in the stack. The unloader is placed on the topmost layer of pots and the retaining elements 20 are urged into the pots, either by the user pressing downwardly on handle 13 or by the weight of the unloader. This downward force causes the retaining elements to engage the interior surfaces of the pots, thereby deforming or compressing them at least slightly at the regions 40 and causing the retaining elements to frictionally engage the pots.

As shown in FIG. 6b, the unloader is then lifted from the carton and it carries with it the first layer of pots P. The unloader is then positioned above a typical greenhouse tray T. It is especially advantageous if the number of pots that can be carried by the unloader corresponds to the number of pots that are to be placed on the tray T.

In order to strip the pots from the carrier, the user grasps the handle 16 and draws it toward the upper portion of the handle 13. This draws the plates 10 and 11 together and results in projecting the pins 14 further beyond the lower surface of lower plate 11. In this position, the pins engage the bottoms of the pots and strip the pots from the retaining elements 20 and deposit them in an organized array on the tray T. The unloader device is thereafter returned to the carton and the process is repeated with the next layer of pots. Thus, it can be readily seen that the time required for loading pots onto trays can be substantially reduced because an entire tray can be loaded in one step.

Referring again to the form shown in FIG. 5, this form operates in essentially the reverse of that previously described. In this arrangement, the operator first grasps the handles 26 and 27 and draws them together, thereby raising the lower plate 25 with respect to the upper plate 24. Then the unloader is placed on the first layer of pots or cells in the shipping container and the retaining members 30 are introduced into the pots or several of the cavities of the cell and the pots or cells are caused to adhere to the unloader. Thereafter, the operator lifts the unloader from the carton while maintaining the handles 26 and 27 together and the unloader with adhered pots is disposed over a tray. Then the operator relaxes his grasp on the handle 27, thereby allowing the springs 31 to force the plates 24 and 25 apart. The retaining elements 30 are sized and configured to hold the pots in a position so that, when the lower plate 25 moves downwardly, it engages the upper edges of the pots and forces them off the retaining elements.

It can be seen that with either form, there is a substantial advantage from the standpoint of operator time, and in commercial operations, the amount of time saved can be extremely significant.

Although a hand-manipulable unloading device has been described, it should be realized that automatic machinery employing the basic features of the unloading device is also contemplated. In such arrangements, the unloading device could be mounted on a frame that can move both vertically and horizontally and, in essence, duplicate the actions of the hand and arm of the user of the manual embodiment. One station of the machine would be adapted to receive the cartons containing the nested cells or pots and a second station would be adapted to receive the trays on which the pots are to be placed. Of course, conveyors could be used to supply the cartons to the first station and to carry the trays through the second station.

I claim:

1. An unloader for stacked, hollow, open-topped articles, comprising:
    a first means on one portion of the unloader for engaging a portion of the interior of a hollow article, including elastomeric means responsive to engagement with interior wall surfaces of the article as said first means is inserted into the article to hold the article thereon with sufficient retentive force to overcome gravitational forces acting on the article; and
    a second means for disengaging the hollow articles from said first means by engagement with the interior bottom surface of the article.

2. Apparatus as in claim 1 wherein the first means comprises a flexible, elastically compressible element.

3. Apparatus as in claim 2 wherein the first means comprises a body of elastomeric material.

4. Apparatus as in claim 3 wherein the elastomeric material comprises a foam.

5. Apparatus as in claim 1 wherein the disengaging means comprises means for engaging the hollow articles and urging them out of contact with the elastomeric means.

6. Apparatus as in claim 1 wherein a plurality of first means are mounted on the unloader.

7. Apparatus as in claim 1 wherein the unloader comprises a top plate and a bottom plate, means for mounting the two plates together with the plates being substantially parallel and with the plates relatively movable toward and away from each other, means for biasing the plates apart, stop means for limiting separation of the plates, and means associated with the bottom plate for causing relative movement of the plates together.

8. Apparatus as in claim 7 wherein the first means is mounted on the bottom plate and the disengaging means is mounted on the top plate.

9. Apparatus as in claim 8 wherein the disengaging means comprises a pin extending from the top plate through the bottom plate and located to engage the hollow articles.

10. Apparatus as in claim 9 wherein the pins extend through the elastomeric means.

11. Apparatus as in claim 9 or 10 wherein the pin extends beyond the elastomeric means when the plates are separated by the greatest distance allowed by the stop means.

12. Apparatus as in claim 7 wherein the first means is mounted on the top plate and the bottom plate is disposed intermediate the first means and the top plate, the disengaging means being disposed on the bottom plate.

13. Apparatus as in claim 7, 8, 9, 10, or 12 wherein there are a plurality of retaining elements, each retaining element comprising a flexible, resilient member.

14. Apparatus as in claim 7, 8, 9, 10, or 12 wherein the stop means comprises one or more flexible elements extending between the top and bottom plates.

15. A method of unloading a plurality of nested, hollow, open-mouthed articles from a container simultaneously, comprising:
placing a carrier element on a top layer of articles in the container with elastomeric retainer elements on the carrier element disposed in engagement with interior wall surfaces of at least some of the articles in the layer;
obtaining sufficient retentive force from engagement of the retaining elements with the articles as the retaining members are urged into engagement with the interior surfaces of the articles to overcome gravitational forces on the articles;
lifting the carrier element from the container and transporting the carrier element and engaged hollow articles to an unloading point while maintaining the initial positions and spacing of the articles with respect to each other; and
urging the articles out of engagement with the retainer elements by pushing against the inside of the articles to push the articles axially off of the retaining elements in a manner whereby an organized array of articles is deposited with their hollow interiors disposed upwardly.

16. The method as in claim 15 wherein the hollow articles are plant pots.

17. An unloader for hollow articles, comprising:
an upper plate and a lower plate;
means mounting the plates in spaced relation and for relative movement;
biasing means for biasing the plates apart;
stop means for limiting separation of the plates;
handle means for facilitating manual manipulation of the unloader;
means for mounting the handle means on the upper plate;
retainer elements extending below the lower plate, the retainer elements having compressible article-engaging portions for frictionally adhering the article on the retainer elements by engagement with the walls of said article;
manually actuable means for effecting relative movement of the plates; and
ejection means responsive to movement of the plates for stripping off articles retained on the retainer elements by engagement with the interior bottom surface of said articles.

18. Apparatus as in claim 17 wherein the retainer elements are mountable on the lower plate and the ejection means is associated with the upper plate.

19. Apparatus as in claim 17 including means for mounting the retainer elements on the upper plate and wherein the ejection means is associated with the lower plate.

* * * * *